(12) United States Patent
Shin

(10) Patent No.: US 10,650,504 B2
(45) Date of Patent: May 12, 2020

(54) IMAGE PROCESSING APPARATUS, AND IMAGE PROCESSING METHOD

(71) Applicant: CANON KABUSHIKI KAISHA, Tokyo (JP)

(72) Inventor: Akihito Shin, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 42 days.

(21) Appl. No.: 15/711,783

(22) Filed: Sep. 21, 2017

(65) Prior Publication Data

US 2018/0089811 A1  Mar. 29, 2018

(30) Foreign Application Priority Data

Sep. 27, 2016 (JP) ................. 2016-188327

(51) Int. Cl.
| | |
|---|---|
| *G06T 5/20* | (2006.01) |
| *H04N 5/238* | (2006.01) |
| *G06T 5/00* | (2006.01) |
| *H04N 5/235* | (2006.01) |
| *G06T 7/90* | (2017.01) |
| *G03B 27/80* | (2006.01) |
| *G06K 9/38* | (2006.01) |
| *H04N 1/407* | (2006.01) |

(52) U.S. Cl.
CPC ............. *G06T 5/20* (2013.01); *G03B 27/80* (2013.01); *G06K 9/38* (2013.01); *G06T 5/009* (2013.01); *G06T 7/90* (2017.01); *H04N 1/407* (2013.01); *H04N 5/238* (2013.01); *H04N 5/2351* (2013.01); *H04N 5/2352* (2013.01)

(58) Field of Classification Search
None
See application file for complete search history.

(56) References Cited

U.S. PATENT DOCUMENTS

| | | | | |
|---|---|---|---|---|
| 2006/0092182 | A1* | 5/2006 | Diefenbaugh | G06F 1/3218 |
| | | | | 345/690 |
| 2009/0268041 | A1* | 10/2009 | Chou | H04N 5/23248 |
| | | | | 348/208.6 |
| 2013/0079983 | A1* | 3/2013 | Ehlgen | B60Q 1/14 |
| | | | | 701/36 |
| 2013/0128002 | A1* | 5/2013 | Muramatsu | G03B 35/08 |
| | | | | 348/47 |
| 2017/0148142 | A1* | 5/2017 | Park | H04N 5/23229 |

FOREIGN PATENT DOCUMENTS

JP  2004-286979 A  10/2004

* cited by examiner

*Primary Examiner* — Kevin Ky
(74) *Attorney, Agent, or Firm* — Canon U.S.A., Inc. IP Division

(57) ABSTRACT

An apparatus includes a first brightness value acquisition unit configured to obtain a first absolute brightness value by converting a representative brightness value of an image obtained using an image pickup unit, into absolute brightness, a first determination unit configured to determine an output value based on an input-output characteristic of an output device, the output value corresponding to the first absolute brightness value obtained by the first brightness value acquisition unit, and a second determination unit configured to determine information about exposure corresponding to the output value.

17 Claims, 5 Drawing Sheets

IMAGE PROCESSING APPARATUS, AND IMAGE PROCESSING METHOD

BACKGROUND OF THE INVENTION

Field of the Invention

The aspect of the embodiments relates to an image processing apparatus, and an image processing method for presenting display of an image in absolute brightness.

Description of the Related Art

Brightness of an input image has conventionally been determined according to a dynamic range of brightness (hereinafter, simply referred to as a dynamic range) displayable in an output device such as a television set and a display. For example, when an image pickup apparatus is used to capture an image of an object, a video signal obtained by capturing an object image is compressed according to the dynamic range of the output device. For example, a face area which is a main object within an angle of view can be displayed in viewable brightness by compressing the brightness of the face area at a predetermined ratio with respect to an upper limit value of the brightness displayable by the output device.

However, in such a case, the face area is displayed in brightness different from the actual object. This reduces a sense of realism of the displayed image compared to the actual object observed by the user during the image capture. The tones of objects which are brighter than the face area within the angle of view are compressed, whereby the tones of the entire image are lost relative to the brightness of the actual object.

Japanese Patent Application Laid-Open No. 2004-286979 discusses a technique in which when a film is used to capture an image of an object, an average density of the entire image is determined from the average density obtained by averaging transmission densities of pixels on the negative to obtain an absolute brightness value of the object, and the absolute brightness value is converted into a predetermined exposure amount.

SUMMARY OF THE INVENTION

According to an aspect of the embodiments, an apparatus comprising circuitry configured to perform first brightness obtaining process to obtain a first absolute brightness value by converting a representative brightness value of an image obtained by capturing an object image, into absolute brightness, first determining process to determine an output value based on an input-output characteristic of an output device, the output value corresponding to the first absolute brightness value obtained by the first brightness obtaining, and second determining process to determine information about exposure corresponding to the output value.

Further features of the disclosure will become apparent from the following description of exemplary embodiments with reference to the attached drawings.

DESCRIPTION OF THE EMBODIMENTS

Figure 1:
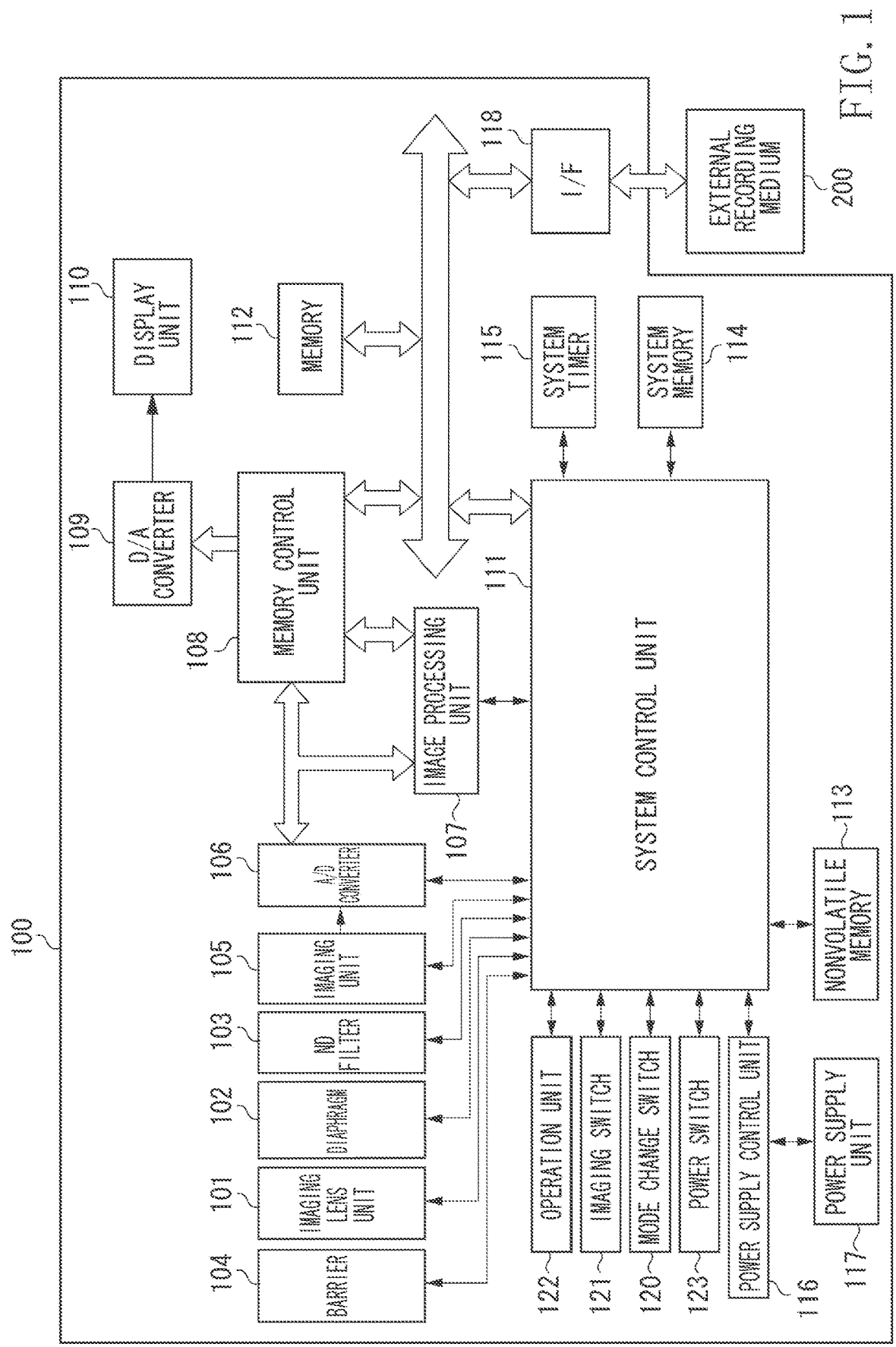
FIG. 1 is a block diagram illustrating a configuration example of a digital video camera which is an exemplary embodiment of an image processing apparatus performing the disclosure.

A first exemplary embodiment will be described below. An exemplary embodiment of the disclosure is described with reference to the accompanying drawings. FIG. 1 is a block diagram illustrating a configuration example of a digital video camera (hereinafter, referred to simply as a video) 100 which is an exemplary embodiment of an image processing apparatus performing the disclosure. One or more functional blocks illustrated in FIG. 1 may be implemented by hardware such as an application specific integrated circuit (ASIC) and a programmable logic array (PLA). Alternatively, one or more functional blocks illustrated in FIG. 1 may be implemented by executing software by a programmable processor such as a central processing unit (CPU) and a microprocessing unit (MPU). Furthermore, one or more functional blocks illustrated in FIG. 1 may be implemented by a combination of software and hardware. In the following description, even if different functional blocks are described as operation subjects, the same piece of hardware can therefore implement the subjects.

As illustrated in FIG. 1, an imaging lens unit 101 is a lens unit including various imaging lenses such as a zoom lens and a focus lens. The imaging lens unit 101 is an optical member for forming an object image. A diaphragm 102 is a first light amount adjustment member for adjusting an amount of a light beam having passed through the imaging lens unit 101. An aperture diameter of the diaphragm 102 is changed to adjust the amount of light entering the inside of the video 100. A neutral density (ND) filter 103 is a second light amount adjustment member for further adjusting the amount of the light beam having passed through the diaphragm 102. The ND filter 103 can be inserted or removed to adjust the amount of light entering the inside of the video 100. The ND filter 103 may be configured to have different transmission densities area by area and control its insertion position to adjust the amount of incident light. A barrier 104 is a lens barrier that transitions between a protection state in which the barrier 104 covers a front (object side) of the imaging lens unit 101 and a retracted state in which the barrier 104 is retracted from the front of the imaging lens unit 101 to allow capture of an object image.

An imaging unit 105 includes a solid-state image sensor of charge accumulation type for converting an optical image into an electrical signal. Examples of the solid-state image sensor include a charge-coupled device (CCD) sensor and a complementary-metal-oxide-semiconductor (CMOS) sensor. The imaging unit 105 is a unit for photoelectrically converting (capturing an image) the light beam of the object which is incident via the imaging lens unit 101, and outputting analog image data (analog image signal).

The imaging unit 105 can perform various functions. The functions include control of a charge accumulation time by controlling reading or reset timing of accumulated charges, which is an electronic shutter function, and adjustments of an analog gain amount and a reading speed.

An analog-to-digital (A/D) converter 106 is an A/D conversion unit for converting analog image data into digital image data. An image processing unit 107 is a unit for performing various types of processing on image data output from the A/D converter 106 or image data which input is controlled by a memory control unit 108. The various types of processing include color conversion processing, tone correction, and an adjustment of a digital gain amount. The image processing unit 107 performs predetermined calculation processing using image data obtained by capturing the object image, and transmits a result of the calculation to a system control unit 111 described below. Based on the result of the calculation received from the image processing unit 107, the system control unit 111 performs various controls and adjustments such as exposure control, ranging control, and white balance adjustment. Through-the-lens (TTL) automatic focus (AF) processing, automatic exposure (AE) processing, and automatic white balance (AWB) processing are thereby executed. Details of the processing executed by the image processing unit 107 will be described below.

The image data output from the A/D converter 106 is written into a memory 112 via the image processing unit 107 and the memory control unit 108, or directly via the memory control unit 108. The memory 112 is a first storage unit for storing image data obtained by using the imaging unit 105 and image data to be displayed on a display unit 110. The memory 112 has a storage capacity sufficient to store a predetermined duration of moving images and sound. The memory 112 also serves as a memory for image display (video memory).

A digital-to-analog (D/A) converter 109 is a D/A conversion unit for converting digital image data for display stored in the memory 112 into analog image data, and supplying the analog image data to the display unit 110. The display unit 110 is a display device such as a liquid crystal display (LCD). The display unit 110 presents display according to the analog image data output from the D/A converter 109. When image data is sequentially transferred to and displayed on the display unit 110, the display unit 110 can function as an electronic viewfinder to present a live view display of the image data.

A nonvolatile memory 113 is an electrically erasable and recordable, second storage unit. For example, an electrically erasable programmable read-only memory (EEPROM) is used as the nonvolatile memory 113. The nonvolatile memory 113 stores operation constants and programs of the system control unit 111. The programs include a program for executing various flowcharts described below in the present exemplary embodiment.

The system control unit 111 is a control unit for controlling an operation of the video 100 in a centralized manner. The system control unit 111 includes a CPU (not illustrated) which is a microprocessor. The system control unit 111 implements processes described below by executing the programs stored in the nonvolatile memory 113. A system memory 114 is a third storage unit including a RAM area. Operation constants of the system control unit 111, variables, and programs read from the nonvolatile memory 113 can be loaded into the system memory 114. The system control unit 111 can control the memory 112, the D/A converter 109, and the display unit 110 to control display of the image data. A system timer 115 is a real-time clock for measuring time used for various controls and the time of a built-in clock.

A mode change switch 120, an imaging switch 121, and an operation unit 122 are units for inputting various operation instructions into the system control unit 111. The mode change switch 120 is a first operation member for switching an operation mode of the system control unit 111 to any one of a moving image recording mode, a still image recording mode, and a playback mode. The moving image recording mode and the still image recording mode include an automatic imaging mode, an automatic scene determination mode, a manual mode, various scene modes, a program AE mode, and a custom mode. In the scene modes, settings are made individually for each imaging scene. The mode change switch 120 may be configured to directly switch an operation to any one of the modes included in the moving image recording mode. Alternatively, the mode change switch 120 may be configured to switch an operation to each mode after it switches the operation to the moving image recording mode.

The imaging switch 121 is a second operation member for switching an operation between an imaging preparation state and an imaging state. For example, a first stroke (half press) of the imaging switch 121 switches the video 100 to the imaging preparation state. A second stroke (full press), in which the imaging switch 121 is further pressed from the first stroke, switches the video 100 to the imaging state. If the imaging switch 121 is not pressed, the video 100 is in an imaging standby state. In the moving image recording mode, when the imaging switch 121 is pressed by a predetermined amount, the system control unit 111 executes a series of operations from the reading of a signal from the imaging unit 105 to the writing of moving image data to an external recording medium 200 described below.

Appropriate functions are assigned scene by scene to each operation member of operation unit 122 when various function icons displayed on the display unit 110 are selected and operated. The operation members thus function as various function buttons. Examples of the function buttons include an end button, a return button, an image forward button, a jump button, an aperture narrow-down button, and an attribute change button. For example, if a menu button is pressed, a menu screen capable of making various settings is displayed on the display unit 110. The user can observe the menu screen displayed on the display unit 110 while operating the operation unit 122 to make various settings in an intuitive manner.

A power supply control unit 116 is a control unit including a battery detection circuit, a direct-current-to-direct-current (DC-DC) converter, and a switch circuit for switching blocks to be energized. The power supply control unit 116 detects whether a battery (not illustrated) is attached, the type of the battery, and the remaining battery level. The power supply control unit 116 controls the DC-DC converter (not illustrated) based on the results of detection and instructions from the system control unit 111. The power supply control unit 116 thereby supplies needed voltages to various parts of the video 100 including the external recording medium 200, for a needed period. The supply of power to various parts of the video 100 is switched on/off by operating a power switch 123 which is a fourth operation member.

A power supply unit 117 is a power supply device including a primary battery such as an alkali battery and a lithium battery, a secondary battery such as a NiCd battery, a NiMH battery, and a Li ion battery, and/or an alternating-current (AC) adapter. An interface unit (I/F) 118 is an interface for performing communication with the external recording medium 200 such as a memory card and a hard disk, or an external output device (not illustrated). The external recording medium 200 is a medium such as a memory card for recording image data obtained by capturing an object image. The external recording medium 200 includes a semiconductor memory and/or a magnetic disk.

(Detailed Configuration of Image Processing Unit 107)

Figure 2:
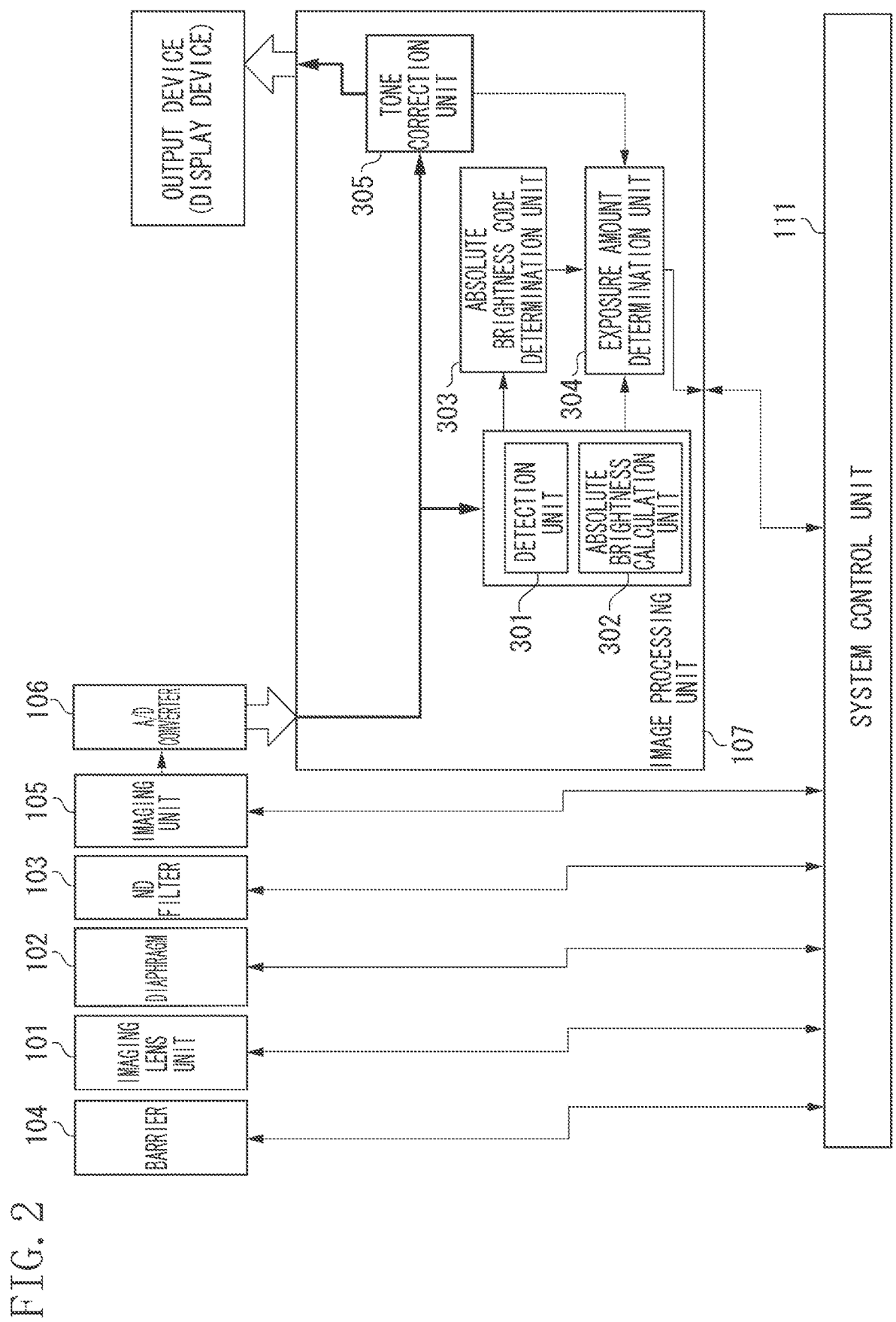
FIG. 2 is an exemplary block diagram illustrating an internal configuration and related parts of an image processing unit according to the embodiment of the disclosure.

Next, an internal configuration of the image processing unit 107 according to the present exemplary embodiment will be described with reference to FIG. 2. FIG. 2 is a block diagram for illustrating the internal configuration and related parts of the image processing unit 107 according to the present exemplary embodiment. While the image processing unit 107 executes white balance control and sharpness control, a description thereof is omitted in the present exemplary embodiment. The blocks in the image processing unit 107 can obtain various types of data through the system control unit 111. The various types of data include information about the diaphragm 102 and the ND filter 103, and exposure conditions (parameters) including a shutter speed and various gain amounts in capturing an image of an object.

As illustrated in FIG. 2, a detection unit 301 is a unit that performs detection processing on image data output from the A/D converter 106 or image data output by controlling the memory control unit 108 to determine a representative brightness value of the image data. Details of the detection processing performed by the detection unit 301 will be described below.

An absolute brightness calculation unit 302 is an absolute brightness calculation unit for calculating a reference signal corresponding to a reference brightness value and an absolute brightness value (hereinafter, referred to simply as Bv value) which expresses the representative brightness value detected by the detection unit 301 in absolute brightness. Details of the absolute brightness value will be described below.

An absolute brightness code determination unit 303 is an output characteristic determination unit for determining an absolute brightness code based on an input-output characteristic of a display device. The absolute brightness code refers to a code about an output characteristic corresponding to the Bv value (absolute brightness value) calculated by the absolute brightness calculation unit 302. The input-output characteristic of the display device connected to the video 100 may be either one that is recorded in the nonvolatile memory 113 in advance or one that is input by the user and read by the memory control unit 108. The absolute brightness code determination unit 303 may be configured to obtain the input-output characteristic from the display device connected to the video 100.

An exposure amount determination unit 304 is a unit for determining exposure (exposure control amount) for the display device which outputs a display image in absolute brightness, based on a tone conversion characteristic described below and the absolute brightness code determined in advance. Based on the exposure determined by the exposure amount determination unit 304, the system control unit (exposure control unit) 111 can control (change) exposure parameters to perform exposure control according to the absolute brightness.

A tone correction unit 305 is a tone correction unit for correcting (changing) the tone conversion characteristic which is an input-output characteristic of a video signal. The tone correction unit 305 performs tone correction on the data from the A/D converter 106 or the data output under control of the memory control unit 108. The configuration of the processing unit 107 according to the present exemplary embodiment has been described above. Processing and controls to be performed by the foregoing units will be described below with reference to FIG. 3.

The absolute brightness (absolute luminance) mentioned above will be described. Conventional display devices, such as a video display and a projector, display a 100% white video signal at a brightness value of 100 nit ($cd/m^2$). Some display devices are known that can present display with a brightness value higher than 100 nit (100 $cd/m^2$). For example, high dynamic range (HDR) displays capable of presenting display with brightness values of 1000 to 4000 nit (4000 $cd/m^2$) are known. An electro-optical transfer function (EOTF) is a conversion function corresponding to a tone conversion characteristic for an HDR display. As an example of the EOTF, an EOTF to which a perceptual quantizer (PQ) system is applied has been standardized. The PQ system refers to a system in which an EOTF that provides visually optimum quantization precision for a display brightness range of up to 10000 nit is used as a reference. Such EOTFs for HDR displays are defined as quantization values with respect to the absolute brightness of the video output of the display devices.

Conventional image pickup apparatuses such as a video camera have a tone conversion characteristic referred to as an optical-electro transfer function (OETF). The OETF usually has a characteristic approximate to the inverse characteristic of a display EOTF, or a characteristic taking account of the total tone of the system. For example, an OETF defined by BT.709 is one optimized to a monitor that can present the foregoing brightness display at 100 nit.

Such a camera system OETF is expressed in terms of relative brightness instead of the foregoing absolute brightness. For example, a sensor output value varies with the settings of the aperture value, the shutter speed, and the gain amount. The relative brightness OETF assigns a sensor output with respect to an object having a standard reflectance to the sensor output value as a predetermined reference value. According to BT.709, appropriate exposure is typically determined by using the output value of a standard white object or 18% gray object as a reference signal (reference brightness value).

As described above, absolute brightness is expressed by an absolute value (fixed value) determined for a predetermined output characteristic (code) in advance, and enables display at a constant display brightness relative to an output value since the relationship between the tone value and display brightness is defined. On the other hand, in relative brightness, the upper and lower limits of the display brightness vary with the output value. For example, display brightness corresponding to an output value may vary depending on the display device.

For example, suppose that the brightness of image data obtained on image processing apparatus side such as an image pickup apparatus is calculated in relative brightness, and a brightness of 70% is defined to be an appropriate brightness of a main object area while an upper limit value of expressible brightness is 100%. In such a case, if the actual main object has a brightness value of 300 nit in absolute brightness and the upper limit of the expressible brightness values of the display device is 1000 nit, the display device displays the main object at a brightness value of 700 nit. In other words, the brightness of the main object presented on the display device is largely different from the actual brightness. This results in an unnatural image (video image) display with less sense of realism.

Other than the PQ system, a plurality of methods is discussed for absolute brightness display. If an output value is determined on the image processing apparatus side regardless of the input-output characteristic which can be presented by the display device, the display device presents a display image at a brightness value different from that of the actual brightness.

As described above, if the image processing apparatus side is unable to output image data having brightness suited to the characteristic of the display device, it is difficult for the image processing apparatus to determine how much the current exposure deviates from the brightness of the actual object. The image processing apparatus is therefore not able to perform exposure control so that the display image on the display device has the brightness of the actual object. The present exemplary embodiment solves the foregoing situation by determining the absolute brightness value of the image data and performing exposure control based on the absolute brightness value and the characteristic of the display device. Details are described below.

(Details of Exposure Change Processing)

Figure 3:
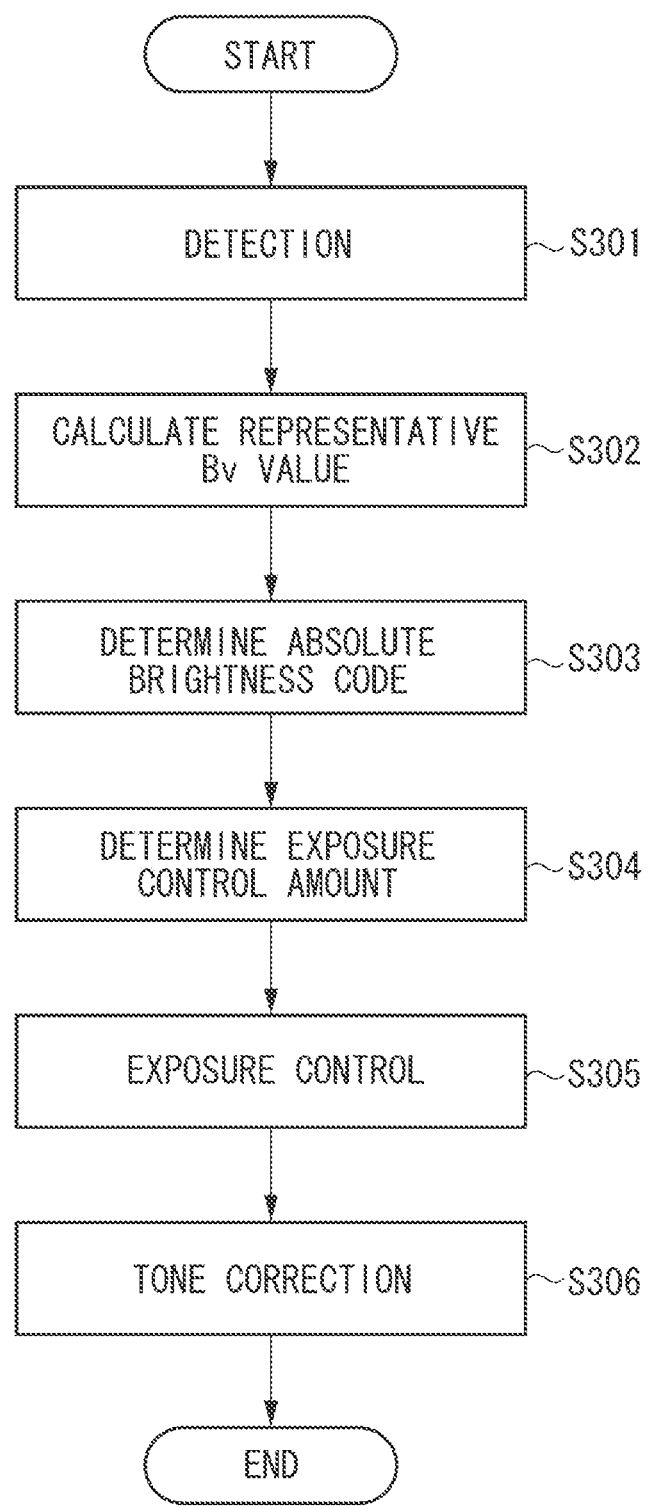
FIG. 3 is a flowchart illustrating an operation of exposure change processing according to the exemplary embodiment of the disclosure.

Next, an operation of the exposure change processing of the image processing apparatus according to the present exemplary embodiment will be described with reference to FIG. 3. FIG. 3 is a flowchart illustrating an operation of the exposure change processing according to an exemplary embodiment of the disclosure. When the video 100 is powered on, the system control unit 111 controls various units of the video 100 to capture an image of an object and obtain pre-image data for detection (hereinafter, each piece of image data will be referred to simply as an image). During acquisition of a pre-image, the exposure recorded in the nonvolatile memory 113 in advance is used. In the present exemplary embodiment, the exposure change processing is described which is started when power is turned on. However, this is not restrictive. For example, the exposure change processing may be performed at every predetermined number of frames in obtaining a moving image for recording or a live view (LV) display image. The exposure change processing may be performed in response to detection of a change in the brightness of the object by a conventional method. In other words, any information about the presence or absence of a change in exposure when capturing an object image to obtain an image may be used as a trigger to start the exposure change processing.

In step S301, the detection unit 301 performs detection on the obtained image, and determines a representative brightness value of the image. In performing the detection, the detection unit 301 according to the present exemplary embodiment calculates brightness values by multiplying average brightness values in each predetermined area where the image is divided, by coefficients to which weight is assigned to a greater degree regarding the acquisition of a brightness value in substantially center portions of the image. The detection unit 301 then calculates an average value of the brightness values of each area as a representative brightness value of the image. In the present exemplary embodiment, the representative brightness value is calculated by conversion into a code value based on a predetermined conversion characteristic. Suppose, for example, that the code value of the representative brightness value is 2132. Instead of calculating the representative brightness value by the conversion into a code value, the detection unit 301 may be configured to obtain a representative brightness value converted into an Additive System of Photographic Exposure (APEX) unit. In such a case, the value in the APEX unit is to be converted into a code value in subsequent processing.

The method for calculating the representative brightness value is not limited to the foregoing. For example, the detection unit 301 may be configured to calculate the representative brightness value by placing weight on a specific object portion detected by a conventional method. In this case, considering that the dynamic range changes at the time of shooting due to subsequent exposure control, an object that can be detected regardless of a change of the dynamic range is selected as the specific object. In such a case, the detection unit 301 can set thresholds serving as upper and lower limit values of brightness of an object that can become the specific object, according to the dynamic range of the imaging unit 105, and select an object existing between the thresholds.

In step S302, the absolute brightness calculation unit 302 calculates a Bv value (absolute brightness value) which indicates the representative brightness value expressed in terms of absolute brightness. A method for calculating the Bv value will be described. For example, the Bv value is calculated from a reference brightness value (reference signal), exposure parameters such as the aperture value, the shooting sensitivity, and the shutter speed in obtaining (capturing) the pre-image, and the representative brightness value obtained by the detection unit 301. The reference brightness value is a brightness value with reference to an object that provides 18% gray input in the image data (object showing a reflectance of 18%). When the exposure parameters are converted into APEX units, a reference Bv value (reference absolute reference value) which is the reference brightness value expressed in absolute brightness is given by Eq. (1):

$$\text{Reference } Bv \text{ value} = 2^{(Av+Tv-Sv)} \times (0.32 \times k)[\text{cd/m}^2] \quad (1)$$

In Eq. (1), Av is the aperture value, Tv is the shutter speed, and Sv is exposure (exposure control value) in an APEX unit into which the shooting sensitivity is converted. k is a correction coefficient. The correction coefficient k is used in converting the brightness value expressed in the APEX unit into a unit of absolute brightness, cd/m² (or nit) so that the 18% gray input is provided. In the present exemplary embodiment, k=12.5. A brightness value Z expressed in the APEX unit can be converted into an absolute brightness value X based on a relative equation $\log_2(x/0.32 \times k) = Z$, i.e., by $X = 2^Z \times (0.32 \times k)$. For example, suppose that Av=F4.0, Tv=1/128, and Sv=International Organization for Standardization (ISO) speed 200. Based on Eq. (1):

$$\text{Reference } Bv \text{ value} = (2^{(4(Av)+7(Tv)-6(Sv))}) \times (0.32 \times 12.5)$$
$$= 128[\text{cd/m}^2].$$

The reference brightness value (reference brightness) related to the reference Bv value is converted into code A, which is a code value based on the output characteristic of the video 100, by using Eq. (2):

$$\text{Code } A = (2^{(number\ of\ bits)}) \times (\text{reference brightness value } [\%]/\text{dynamic range}[\%]) \quad (2)$$

For example, suppose that the dynamic range of the signal the imaging unit 105 can output is 1200%, the reference brightness value is 20% of the upper limit value of the brightness value, and the number of bits of the image data is 14. Then:

$$\text{Code } A = (2^{14}) \times (20/1200)$$

$$\approx 273.$$

The code of the reference signal is thus 273.

Suppose that code B, which is the code value of the representative brightness value calculated above, is 2132. In such a case, code B is expressed as Eq. (3):

$$\text{Code } B = \text{code } A \times \alpha \quad (3)$$

where α is a ratio about a difference between the representative brightness value and the reference brightness value. For example, applying the foregoing parameters to Eq. (3) yields:

$$2132 = 273 \times \alpha$$

$$\alpha \approx 7.81.$$

That is, in the present exemplary embodiment, the ratio about the difference between the representative brightness value and the reference brightness value shows a relationship of 7.81:1. The representative Bv value which is the representative brightness value expressed in absolute value is thus given by Eq. (4):

$$\text{Representative } Bv \text{ value} = (\alpha \times \text{reference } Bv \text{ value}) \quad (4)$$

$$= 7.81 \times 128 [\text{cd/m}^2]$$

$$\approx 1000 [\text{cd/m}^2]$$

The foregoing is an example of the method for calculating the representative Bv value. The absolute brightness calculation unit 302 may be configured to calculate the representative Bv value by using other methods. In other words, in the present exemplary embodiment, the method for calculating the representative Bv value is not limited.

In step S303 the absolute brightness code determination unit 303 determines an absolute brightness code (code C) for display. Code C is a code value for conversion into absolute brightness according to which the image displayed on the display device has the representative Bv value calculated above. In the present exemplary embodiment, the absolute brightness code for display is calculated based on the input-output characteristic of the display device and the representative Bv value calculated in the processing of the foregoing step S302.

Figure 4:
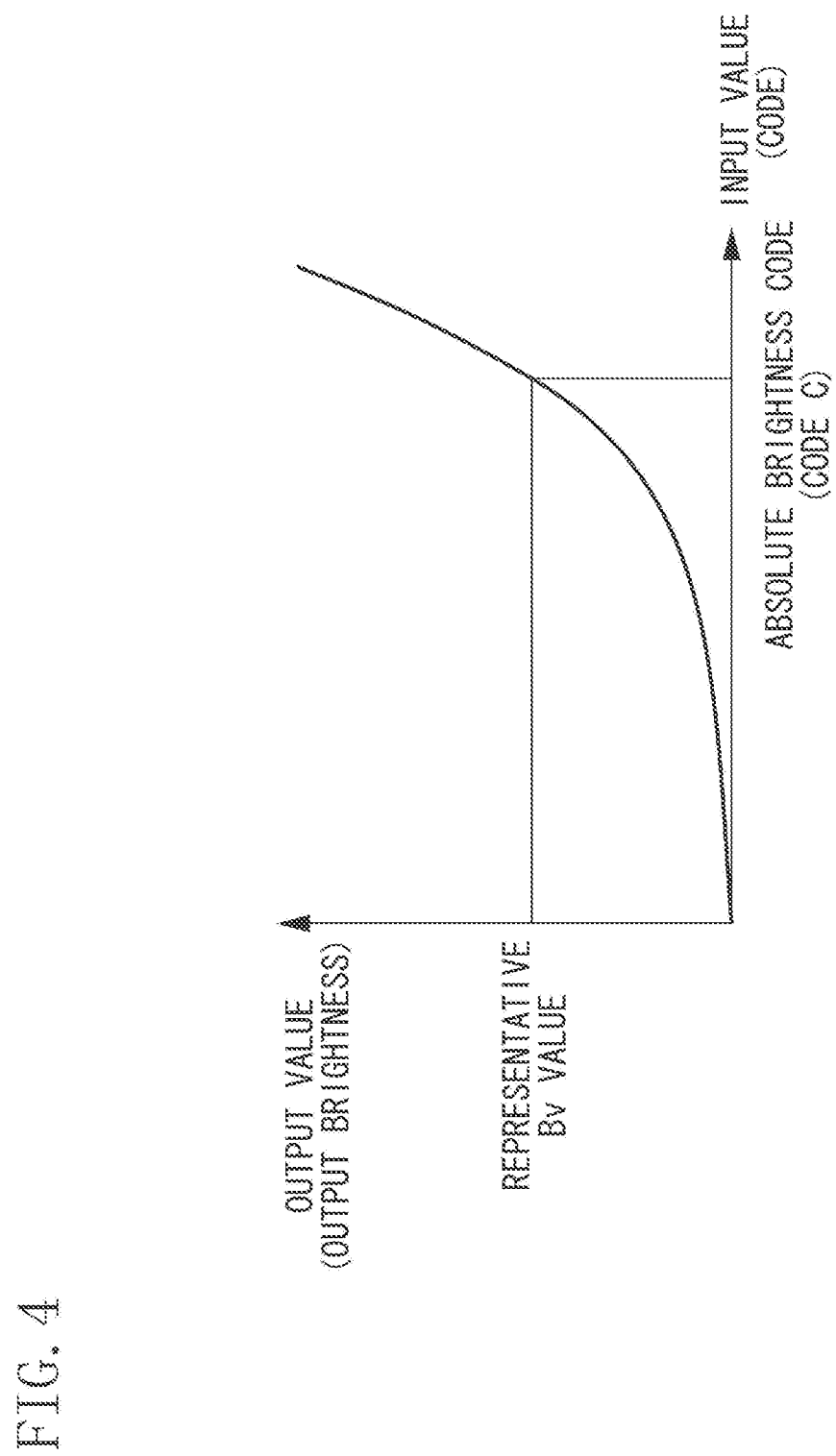
FIG. 4 is an exemplary diagram illustrating an input-output characteristic of an output device (display device).

FIG. 4 is a diagram for illustrating the input-output characteristic of the output device (display device). The vertical axis indicates the output value (output brightness) from the video 100. The horizontal axis indicates the absolute brightness code which is the input value (input signal) to the display device. If the display device has an input-output characteristic as illustrated in FIG. 4, the input value (absolute brightness code) serving as the representative Bv value which is the output value calculated by the video 100 is determined by the graph. In the present exemplary embodiment, the absolute brightness code is determined based on the graph about the input-output characteristic of the display device illustrated in FIG. 4. However, this is not restrictive. For example, the absolute brightness code determination unit 303 may be configured to use a calculation formula indicating the input-output characteristic of the display device corresponding to the graph. Further, the absolute brightness code determination unit 303 may be configured to use table data indicating absolute brightness codes corresponding to representative Bv values.

In step S304, after the determination of the absolute brightness code for display based on the input-output characteristic of the display device, the exposure amount determination unit 304 calculates an exposure control amount β based on the absolute brightness code calculated in step S303. Specifically, the exposure amount determination unit 304 calculates the exposure control amount β such that the output from the tone correction unit 305 becomes the absolute brightness code calculated in step S303 with respect to the representative brightness value obtained in advance.

Figure 5:
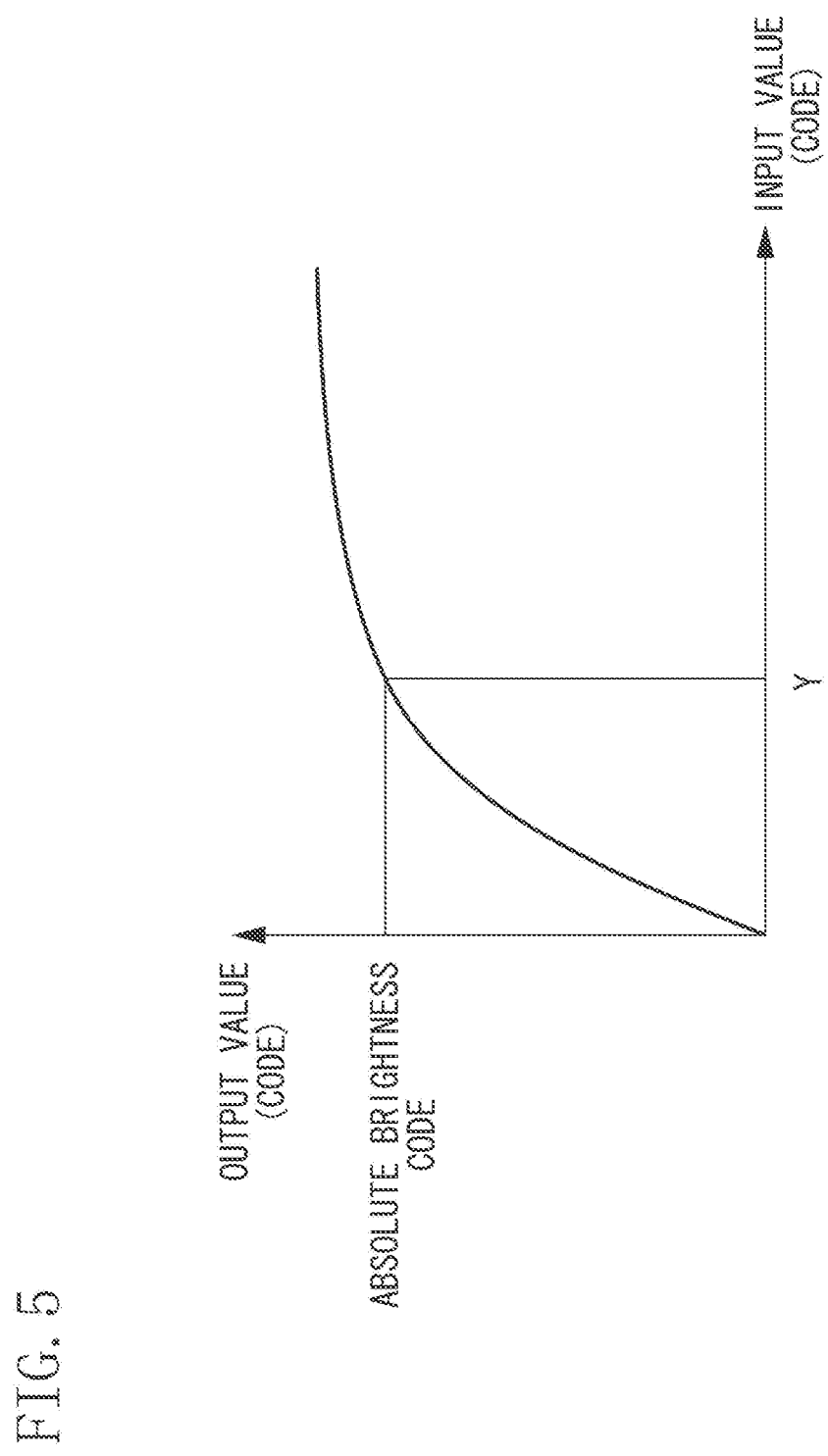
FIG. 5 is an exemplary diagram illustrating a tone conversion characteristic of the digital video camera according to the embodiment of the disclosure.

For example, the exposure amount determination unit 304 can obtain the tone conversion characteristic of the video 100 from the tone correction unit 305, and calculate the exposure control amount β based on the tone conversion characteristic. FIG. 5 is a diagram for illustrating the tone conversion characteristic of the video 100 according to an exemplary embodiment of the disclosure. FIG. 5 illustrates the absolute brightness code for display (code C) calculated in advance, the code input to the tone correction unit 305. More specifically, code Y is a code value for tone correction corresponding to absolute brightness. The code Y refers to the input value input to the tone correction unit 305 such that the output value becomes the absolute brightness code according to the tone conversion characteristic of the video 100. In the present exemplary embodiment, a graph about the relationship between the absolute brightness code and code Y for tone correction as illustrated in FIG. 5, is recorded in the video 100 in advance, and code Y is determined based on the graph. However, such a configuration is not restrictive. For example, a calculation formula or table data corresponding to the graph may be recorded inside the video 100 or in an apparatus or cloud data connected to the video 100, and code Y may be calculated based on the calculation formula or table data.

If the tone conversion characteristic is inverse (counterbalancing) to the input-output characteristic of the display device, the exposure control amount β is given by Eq. (5) in a case where the absolute brightness code corresponds to the representative brightness value as the output value:

$$\text{Exposure control amount } \beta = Y/\text{representative brightness value.} \quad (5)$$

The representative brightness value calculated in step S301 is used as the representative brightness value. In the present example, the tone conversion characteristic is described as inverse (counterbalancing) to the input-output characteristic of the display apparatus. However, this is not restrictive.

In step S305, the system control unit 111 operates various units of the video 100 to perform exposure control based on the exposure control amount β determined in step S304. For example, if the exposure control amount β determined by the processing of step S304 is ½ (i.e., 0.5), the system control unit 111 performs exposure control by changing one or more of the exposure parameters to reduce exposure in the APEX unit by one stop. That is, the exposure control amount β is calculated as a change rate (change amount) relative to the current exposure set in the video 100.

A method for the exposure control will be described. The exposure control is performed by changing at least one of the exposure parameters, i.e., the aperture value, the shutter speed, and the shooting sensitivity. In addition to the foregoing three exposure parameters, a light attenuation ratio of the amount of light entering the inside of the video 100 by the ND filter (not illustrated) may be changed for exposure control.

Based on the calculated exposure control amount β the system control unit 111 may change time needed to complete a change of exposure from the current exposure condition. Specifically, if the exposure change amount β is greater than or equal to a predetermined value, the system control unit 111 changes the exposure to a target value of exposure stepwise by a plurality of frames. In the present exemplary embodiment, the predetermined value is a value equivalent to two steps of exposure in the APEX unit. On the other hand, if the exposure change amount β is smaller than the predetermined value, the system control unit 111 changes the exposure within the duration of one frame. With such a configuration, exposure changeable within a predetermined period can be controlled, so that a video image can be output in which brightness changes smoothly between images.

In step S306, the tone correction unit 305 corrects the tone conversion characteristic applied to the obtained image according to the exposure control performed in advance. The exposure change processing according to the present exemplary embodiment has been described above. As described above, the video 100 according to the present exemplary embodiment is configured to convert the representative brightness value of the obtained image into absolute brightness in view of the input-output characteristic of the output device such as a display device, and perform exposure control based on the absolute brightness. With such a configuration, exposure control in view of the input-output characteristic of the output device can be performed to display an image having a sense of realism by preventing reduction in the reproducibility of the brightness of the actual object. The video 100 according to the present exemplary embodiment can thus present video display adjusted to the actual brightness of the object in view of the input-output characteristic of the output device.

The exemplary embodiment of the disclosure has been described above. The disclosure is not limited thereto, and various changes and modifications may be made without departing from the gist of the disclosure. For example, in the foregoing exemplary embodiment, only a case where the representative brightness value is converted into absolute brightness to calculate the value has been described. However, this is not restrictive. For example, the video 100 may be able to switch between an absolute brightness mode (first mode) in which absolute brightness is calculated as the representative brightness value, and a relative brightness mode (second mode) in which, unlike the first mode, relative brightness is calculated as the representative brightness value.

In such a case, the system control unit 111 serving as a detection (determination) unit for detecting (determining) the output device detects the display device connected to the video 100. The system control unit 111 serving as a mode change unit for switching between the foregoing two modes may be configured to automatically switch the foregoing modes based on the result of detection. For example, the system control unit 111 controls each unit of the video 100 to enter the absolute brightness mode if the upper limit of the display brightness of the display device exceeds 1000 nit, and enter the relative brightness mode if the upper limit of the display brightness is lower than or equal to 1000 nit. An arbitrary value may be employed as the upper limit (threshold) of the display brightness, whereas the value allows a distinction between an HDR display and a standard dynamic range (SDR) display having a narrow dynamic range of display brightness. Further, the video 100 may be configured such that the first and second modes can be switched when the user inputs an operation.

If the representative brightness value is calculated in terms of relative brightness (second mode), the processing corresponding to steps S302 and S303 of FIG. 3 can be omitted. In the processing of step S304, the exposure amount determination unit 304 calculates an exposure control value to reach the target value based on the representative brightness value. For example, if the representative brightness value is calculated by adding weight to a great degree to a face area that is a main object in the image, as the target value the brightness of the face area is approximately 70% of the upper limit value of the brightness values expressed in terms of relative brightness. Suppose that the tone (gamma) correction characteristic is inverse to the input-output characteristic of the display device (output device), and the number of bits of the image is 14. The exposure control value is given by Eq. (6):

$$\text{Exposure control value} = (0.7 \times (2^{14}))/\text{representative brightness value} \quad (6)$$

The subsequent processing is similar to step S305 and the subsequent steps described above.

In the foregoing exemplary embodiment, the image processing apparatus including the imaging unit 105 is the digital video camera 100 which is an image pickup apparatus. However, this is not restrictive. For example, an image pickup apparatus and an image processing apparatus may be configured as separate members, and the image processing apparatus may be configured to perform the foregoing exposure change processing based on image data obtained from the image pickup apparatus. In such a case, the image processing apparatus calculates the exposure change amount β inside the apparatus, and transmits information about the exposure change amount β to the image pickup apparatus side. The image pickup apparatus side may be configured to control exposure when capturing and obtaining an object image, based on the information about the exposure change amount β obtained from the image processing apparatus. The connection between the image pickup apparatus and the image processing apparatus is not limited to a wired connection. A wireless connection or a connection via another host apparatus may also be used.

In the foregoing exemplary embodiment, the units constituting the video 100 such as the image processing unit 107 and the system control unit 111, operate in cooperation with each other to control the operation of the video 100. However, such a configuration is not restrictive. For example, a (computer) program according to the flow illustrated in FIG. 3 described above may be recorded in the nonvolatile memory 113 in advance. The system control unit 111 including a microcomputer may be configured to execute the program to control the operation of the video 100. The program may be in any form as long as the functions of the program are provided. Examples include object code, a program executed by an interpreter, and script data supplied to an operating system (OS). Examples of a recording medium for supplying the program may include magnetic recording media such as a hard disk and a magnetic tape, and optical/magnetooptical recording media.

In the foregoing exemplary embodiment, the digital video camera 100 is described as an example of the image pickup apparatus carrying out an exemplary embodiment of the disclosure. However, this is not restrictive. For example, an image pickup apparatus other than a digital camera may be employed. For example, portable devices such as a digital camera and a smartphone, a wearable terminal, and a security camera may be employed.

Other Exemplary Embodiments

An exemplary embodiment of the disclosure may be carried out by processing for supplying a program for implementing one or more functions of the foregoing exemplary embodiment to a system or an apparatus via a network or a storage medium, and reading and executing the program with one or more processors of a computer of the system or apparatus. Further, an exemplary embodiment of the disclosure may be carried out by using a circuit (for example, ASIC) that implements one or more of the functions.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-188327, filed Sep. 27, 2016, which is hereby incorporated by reference herein in its entirety.

What is claimed is:

1. An apparatus comprising circuitry configured to perform
   first brightness obtaining process to obtain a first code corresponding to a first absolute brightness value by converting a representative brightness value of a first image obtained by capturing an object image, into absolute brightness,
   first determining process to determine, based on an input-output characteristic of an output device, a second code indicating an output value corresponding to the first code, and
   second determining process to determine information about an exposure control amount so that a code corresponding to a representative brightness value of a second image that is obtained after the first image by capturing an object image is same as the second code,
   wherein the first determining process includes using a calculation formula indicating the input-output characteristic of the output device corresponding to a graph,
   the apparatus further comprising the circuitry configured to perform second brightness obtaining process to obtain a third code corresponding to a second absolute brightness value by converting into absolute brightness a reference brightness value corresponding to a predetermined reflectance in the image obtained by capturing the object image,
   wherein the first brightness obtaining process obtains the first absolute brightness value based on information about a ratio about a difference between a code corresponding to the representative brightness value of the first image and the third code and information about the second absolute brightness value obtained by the second brightness obtaining.

2. The apparatus according to claim 1, wherein the first brightness obtaining process obtains the first absolute brightness value according to a change in exposure when capturing the object image to obtain image data.

3. The apparatus according to claim 1, further comprising circuitry configured to perform tone correcting process to correct the output value determined by the first determining process based on a predetermined tone conversion characteristic,
   wherein the second determining process determines the information about the exposure based on an input value corresponding to the output value in the predetermined tone conversion characteristic and information about the representative brightness value, the input value being an input signal used in the tone correcting.

4. The apparatus according to claim 1, further comprising circuitry configured to perform exposure controlling process to execute exposure control based on the information about the exposure,
   wherein the exposure controlling changes time needed to complete change of exposure based on the information about the exposure.

5. The apparatus according to claim 4, wherein when an exposure change amount based on the information about the exposure is greater than or equal to a predetermined value, the exposure controlling makes the time needed to complete the change of exposure greater than when the exposure change amount is smaller than the predetermined value.

6. The apparatus according to claim 1, further comprising an image pickup device,
   wherein the first brightness obtaining process selects a predetermined object based on a dynamic range about brightness of the image pickup device when obtaining the first absolute brightness value while adding a greater degree of weight about acquisition of a brightness value to the predetermined object than to other objects.

7. The apparatus according to claim 1, further comprising circuitry configured to perform
   detecting process to detect an output device connected to the apparatus, and
   mode changing process to switch, based on a result of the detecting process, between a first mode and a second mode as a mode in which the representative brightness value is obtained, wherein the first brightness obtaining process obtains the first absolute brightness value in the first mode.

8. A control method for an apparatus comprising:
   first brightness obtaining process to obtain a first code corresponding to a first absolute brightness value by converting a representative brightness value of a first image obtained by capturing an object image into absolute brightness;
   first determining process to determine, based on an input-output characteristic of an output device configured to output the image, a second code indicating an output value corresponding to the first code; and second determining process to determine information about an exposure control amount so that a code corresponding to a representative brightness value of a second image that is obtained after the first image by capturing an object image is same as the second code, wherein the first determining process includes using a calculation formula indicating the input-output characteristic of the output device corresponding to a graph, the method further comprising second brightness obtaining process to obtain a third code corresponding to a second absolute brightness value by converting into absolute brightness a reference brightness value corresponding to a predetermined reflectance in the image obtained by capturing the object image, wherein the first brightness obtaining process obtains the first absolute brightness value based on information about a ratio about a difference between a code corresponding to the representative brightness value of the first image and the third code and information about the second absolute brightness value obtained by the second brightness obtaining.

9. The control method according to claim 8, wherein the first brightness obtaining process obtains the first absolute brightness value according to a change in exposure when capturing the object image to obtain image data.

10. The control method according to claim 8, further comprising tone correcting process to correct the output value determined by the first determining process based on a predetermined tone conversion characteristic, wherein the second determining process determines the information about the exposure based on an input value corresponding to the output value in the predetermined tone conversion characteristic and information about the representative brightness value, the input value being an input signal used in the tone correcting.

11. The control method according to claim 8, further comprising exposure controlling process to execute exposure control based on the information about the exposure, wherein the exposure controlling changes time needed to complete change of exposure based on the information about the exposure.

12. The control method according to claim 8, wherein the first brightness obtaining process selects a predetermined object based on a dynamic range about brightness of an image pickup device when obtaining the first absolute brightness value while adding a greater degree of weight about acquisition of a brightness value to the predetermined object than to other objects.

13. A non-transitory computer-readable storage medium storing a program for causing a computer to execute a control method for an apparatus, the control method comprising first brightness obtaining process to obtain a first code corresponding to a first absolute brightness value by converting a representative brightness value of a first image obtained by capturing an object image into absolute brightness, first determining process to determine, based on an input-output characteristic of an output device configured to output the image, a second code indicating an output value corresponding to the first code, and second determining process to determine information about an exposure control amount so that a code corresponding to a representative brightness value of a second image that is obtained after the first image by capturing an object image is same as the second code, wherein the first determining process includes using a calculation formula indicating the input-output characteristic of the output device corresponding to a graph, the non-transitory computer readable storage medium further comprising second brightness obtaining process to obtain a third code corresponding to a second absolute brightness value by converting into absolute brightness a reference brightness value corresponding to a predetermined reflectance in the image obtained by capturing the object image, wherein the first brightness obtaining process obtains the first absolute brightness value based on information about a ratio about a difference between a code corresponding to the representative brightness value of the first image and the third code and information about the second absolute brightness value obtained by the second brightness obtaining.

14. The non-transitory computer readable storage medium according to claim 13, wherein the first brightness obtaining process obtains the first absolute brightness value according to a change in exposure when capturing the object image to obtain image data.

15. The non-transitory computer readable storage medium according to claim 13, further comprising tone correcting process to correct the output value determined by the first determining process based on a predetermined tone conversion characteristic, wherein the second determining process determines the information about the exposure based on an input value corresponding to the output value in the predetermined tone conversion characteristic and information about the representative brightness value, the input value being an input signal used in the tone correcting.

16. The non-transitory computer readable storage medium according to claim 13, further comprising exposure controlling process to execute exposure control based on the information about the exposure, wherein the exposure controlling changes time needed to complete change of exposure based on the information about the exposure.

17. The non-transitory computer readable storage medium according to claim 13, wherein the first brightness obtaining process selects a predetermined object based on a dynamic range about brightness of an image pickup device when obtaining the first absolute brightness value while adding a greater degree of weight about acquisition of a brightness value to the predetermined object than to other objects.

* * * * *